(12) United States Patent
Burton et al.

(10) Patent No.: US 10,498,694 B2
(45) Date of Patent: Dec. 3, 2019

(54) MAPPING IPV4 KNOWLEDGE TO IPV6

(71) Applicant: Microsoft Technology Licensing, LLC, Redmond, WA (US)

(72) Inventors: Lee Reed Burton, Seattle, WA (US); Daniel E. Castro, Kirkland, WA (US); William Jacob Goldenberg, Seattle, WA (US); Mark A. Nikiel, Redmond, OR (US); Pui-Yin Winfred Wong, Redmond, WA (US); Hardy Wijaya, Redmond, WA (US); Hongyu Sun, Issaquah, WA (US); Jingjing Zhang, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 178 days.

(21) Appl. No.: 15/640,269

(22) Filed: Jun. 30, 2017

(65) Prior Publication Data
US 2019/0007371 A1   Jan. 3, 2019

(51) Int. Cl.
*G06F 15/173* (2006.01)
*H04L 29/12* (2006.01)

(52) U.S. Cl.
CPC ........ *H04L 61/251* (2013.01); *H04L 61/6086* (2013.01); *H04L 61/2007* (2013.01)

(58) Field of Classification Search
CPC .............. H04L 61/251; H04L 61/6086; H04L 61/2007
USPC .......................................................... 709/245
See application file for complete search history.

(56) References Cited

U.S. PATENT DOCUMENTS

| 6,928,077 | B2* | 8/2005 | Tsuchiya | ................. | H04L 12/66 370/392 |
| 7,526,562 | B1* | 4/2009 | Samprathi | ......... | H04L 29/12066 370/466 |
| 7,924,832 | B2* | 4/2011 | Li | ..................... | H04L 29/12066 370/389 |

(Continued)

FOREIGN PATENT DOCUMENTS

| CN | 101483602 B | 3/2011 |
| CN | 102970386 A | 3/2013 |
| WO | WO-2005025169 A1 * | 3/2005 | ........... H04L 1/1664 |

OTHER PUBLICATIONS

"IPv6 Configuration Guide, Cisco IOS Release 15.2MT", https://web.archive.org/web/20140402052035/http://www.cisco.com/c/en/us/td/docs/ios-xml/ios/ipv6/configuration/15-2mt/ipv6-15-2mt-book.pdf, Published on: Apr. 2, 2014, pp. 1-979.

*Primary Examiner* — Krisna Lim
(74) *Attorney, Agent, or Firm* — Workman Nydegger

(57) ABSTRACT

Knowledge associated with an address of a first IP type may be mapped to an address of a second IP type. In response to receiving, at a first IP endpoint type, a request from a client associated with a first and second IP address type, a first address of the first IP type associated with the client is recorded. A unique identification of the request is generated. The unique identifier and instructions to make a second request to a second IP endpoint type are sent to the client. The second request, that includes the unique identifier and corresponds to the second IP address type associated with the client, is received at the second endpoint. Both the first address and the second address are determined as corresponding to the client by determining that the unique identifier was used in both requests. The first address is mapped to the second address.

20 Claims, 3 Drawing Sheets

(56) References Cited

U.S. PATENT DOCUMENTS

| | | | | |
|---|---|---|---|---|
| 7,953,076 | B2* | 5/2011 | Kim | H04L 29/12443 |
| | | | | 370/389 |
| 8,775,629 | B1* | 7/2014 | Whittle | H04L 61/2092 |
| | | | | 709/223 |
| 8,848,702 | B2* | 9/2014 | Troan | H04L 45/741 |
| | | | | 370/389 |
| 8,891,551 | B2 | 11/2014 | Park et al. | |
| 2003/0225911 | A1* | 12/2003 | Lee | H04L 29/12066 |
| | | | | 709/245 |
| 2004/0162909 | A1* | 8/2004 | Choe | H04L 29/12066 |
| | | | | 709/230 |
| 2006/0029081 | A1* | 2/2006 | Yan | H04L 29/12009 |
| | | | | 370/395.52 |
| 2008/0080519 | A1* | 4/2008 | Park | H04L 29/12066 |
| | | | | 370/395.54 |
| 2011/0013647 | A1* | 1/2011 | Park | H04L 12/4633 |
| | | | | 370/466 |
| 2013/0080575 | A1* | 3/2013 | Prince | H04L 45/741 |
| | | | | 709/217 |
| 2016/0080212 | A1* | 3/2016 | Ramachandran | G06F 16/285 |
| | | | | 370/338 |
| 2016/0308823 | A1* | 10/2016 | Maslak | H04L 61/1511 |
| 2017/0195256 | A1* | 7/2017 | Javali | H04L 49/25 |
| 2017/0289856 | A1* | 10/2017 | Rune | H04W 36/0016 |

* cited by examiner

MAPPING IPV4 KNOWLEDGE TO IPV6

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

Such computer systems, running in a variety of environments, are each assigned an internet protocol (IP) address. Internet protocol version 4 (IPv4) address have been used for decades, and as such, entities such as corporations have spent vast amounts of resources building knowledge bases regarding particular IPv4 addresses during that time. While the internet is slowly migrating to an internet protocol version 6 (IPv6) infrastructure, IPv6 traffic does not currently benefit from the mature IPv4 knowledge base of geographic location identification, IP address reputation, and IP-based protection infrastructure, that IPv4 traffic does.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to mapping knowledge associated with one or more IP addresses of a first IP type to one or more IP addresses of a second IP type. For example, embodiments may include in response to receiving, at the first endpoint of a dual stack web server comprising at least a first endpoint associated with handling requests of a first internet protocol (IP) type and a second endpoint associated with handling requests of a second IP type, a first request from a client, performing a number of acts. The client may be associated with at least a first IP address of the first IP type and a second IP address of the second IP type. The first request may correspond to the first IP address of the first IP type. Embodiments may include, in response to receiving the request received at the first endpoint, recording the first IP address of the first IP type.

Embodiments may further include generating a unique identification associated with the first request. Embodiments may also include sending, to the client, both the unique identifier and instructions to make a second request associated with retrieving a resource to the second endpoint. Embodiments may further include receiving, at the second endpoint, the second request associated with retrieving the resource. The second request may include the unique identifier and correspond to the second IP address of the second type. Embodiments may further include recording the second IP address of the second IP type and the unique identifier. Embodiments may also include determining that both the first IP address and the second IP address are associated with the client based at least on determining that the unique identifier was used in both the first request and the second request. Embodiments may also include, based on determining that the first IP address and the second IP address are associated with the client, mapping the first IP address to the second IP address.

In this way, accurate and refreshable mapping from IPv6 addresses to IPv4 addresses (and vice versa) may be performed. In particular, mappings can be proven by user connection, thus ensuring accuracy of any given mapping. Similarly, mappings are updated and refreshed in real-time, compared to delayed or stale mapping data gathered from 3rd party data providers. Furthermore, IPv6/128 to IPv4/32 mappings may be used to deduce DHCP subnet levels for different ISP's, which can then be used to approximate an IPv4 address or subnet for an unseen IPv6 address. Notably, such mappings may be gathered in an efficient manner, and performed offline.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
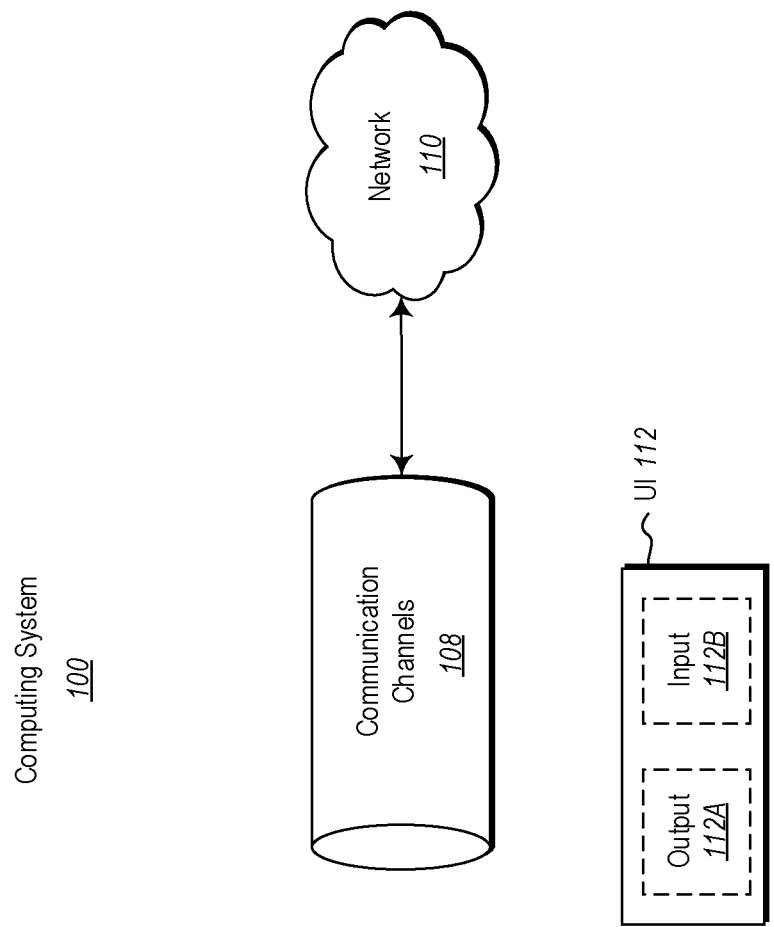
FIG. 1 illustrates an example computer architecture that facilitates operation of the principles described herein.

At least some embodiments described herein relate to mapping knowledge of one or more IP addresses of a first IP type to one or more IP addresses of a second IP type. For example, embodiments may include in response to receiving, at the first endpoint of a dual stack web server comprising at least a first endpoint associated with handling requests of a first internet protocol (IP) type and a second endpoint associated with handling requests of a second IP type, a first request from a client, performing a number of acts. The client may be associated with at least a first IP address of the first IP type and a second IP address of the second IP type. The first request may correspond to the first IP address of the first IP type. Embodiments may include, in response to receiving the request received at the first endpoint, recording the first IP address of the first IP type.

Embodiments may further include generating a unique identification associated with the first request. Embodiments may also include sending, to the client, both the unique identifier and instructions to make a second request associated with retrieving a resource to the second endpoint. Embodiments may further include receiving, at the second endpoint, the second request associated with retrieving the resource. The second request may include the unique identifier and correspond to the second IP address of the second type. Embodiments may further include recording the second IP address of the second IP type and the unique identifier. Embodiments may also include determining that both the first IP address and the second IP address are associated with the client based at least on determining that the unique identifier was used in both the first request and the second request. Embodiments may also include, based on determining that the first IP address and the second IP address are associated with the client, mapping the first IP address to the second IP address.

In this way, accurate and refreshable mapping from IPv6 addresses to IPv4 addresses (and vice versa) may be performed. In particular, mappings can be proven by user connection, thus ensuring accuracy of any given mapping. Similarly, mappings are updated and refreshed in real-time, compared to delayed or stale mapping data gathered from 3rd party data providers. Furthermore, IPv6/128 to IPv4/32 mappings may be used to deduce DHCP subnet levels for different ISP's, which can then be used to approximate an IPv4 address or subnet for an unseen IPv6 address. Notably, such mappings may be gathered in an efficient manner, and performed offline.

Some introductory discussion of a computing system will be described with respect to FIG. 1. Then mapping knowledge of one or more IP addresses of the first IP type to one or more IP addresses of the second IP type will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
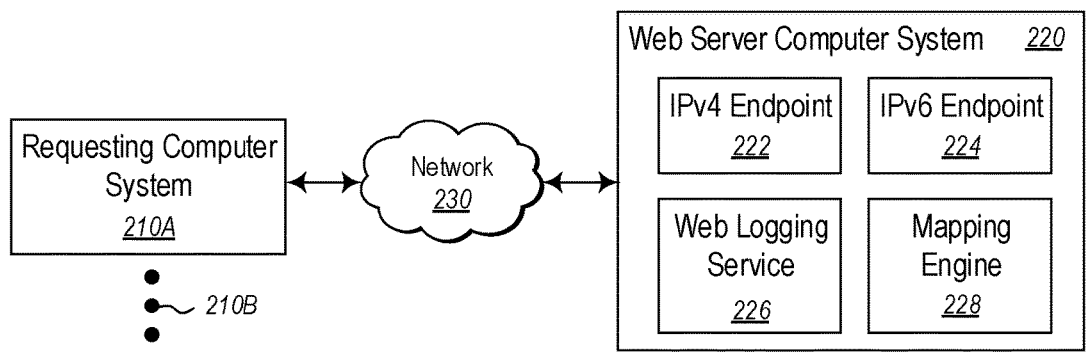
FIG. 2 illustrates an example environment for mapping knowledge associated with one or more IP addresses of a first IP type to one or more IP addresses of a second IP type.

FIG. 2 illustrates a computer environment 200 for mapping knowledge of IPv4 addresses to corresponding IPv6 addresses. As illustrated, the computer environment 200 includes a requesting computer system 210A and a web server computer system 220 (also referred to herein as the "web server" 220). While only one requesting computer system 210A is shown, ellipses 210B illustrates that any number of requesting computer systems may be utilized when practicing the principles described herein. Notably, the principles described herein may be particularly advantageous when a large amount of requesting computer systems are utilized, as further described herein.

The requesting computer system 210 may comprise any type of applicable computer system (e.g., desktop computer, laptop computer, tablet, smartphone, smartwatch, and so forth). Additionally, as shown, the requesting computer system 210A may include a client 212 that is be capable of utilizing network 230 to communicate with the web server 220. For instance, the client 212 may comprise a web browser (e.g., MICROSOFT® EDGE, APPLE® SAFARI®, GOOGLE™ CHROME™, and so forth). As such, the network 230 may comprise any suitable components (i.e., hardware and/or software) that allow the requesting computer system 210A and the web server 220 to communicate over the Internet (e.g., utilizing the Transmission Control Protocol/Internet Protocol (TCP/IP)). Notably, the network 230 may comprise the network 110, as described with respect to FIG. 1.

The web server 220 may comprise any applicable web server capable of processing (e.g., storing, processing, and delivering web pages) received requests (e.g., HTTP requests) over the Internet. For instance, the web server 220 may comprise a web server that hosts, and/or processes requests of, one or more web pages. In particular, the web server 220 may host, and/or process requests of, a popular web page (e.g., www.msn.com, www.google.com, www.amazon.com, and so forth) that receives high volumes of traffic on the Internet. Notably, the web server 220 may also comprise a dual stack web server that is capable of supporting both Internet Protocol version 4 (IPv4) and Internet Protocol version 6 (IPv6). As illustrated, the web server 220 includes an IPv4 endpoint 222, an IPv6 endpoint 224, a web logging service 226, and a mapping engine 228, each of which are described in more detail herein.

As illustrated in FIG. 2, the requesting computer system 210A and the web server 220 include various engines and/or functional blocks that may be used for mapping knowledge of IPv4 addresses to corresponding IPv6 addresses, as further described herein. The various engines and/or functional blocks of the requesting computer system and the web server may be implemented on a local computer system or may be implemented on a distributed computer system that includes elements resident in the cloud or that implement aspects of cloud computing. The various engines and/or functional blocks of the requesting computer system and the web server may be implemented as software, hardware, or a combination of software and hardware.

Notably, the requesting computer system and/or the web server may include more or less than the engines illustrated in FIG. 2. Accordingly, some of the engines and/or functional blocks may be combined or separated as circumstances warrant. For instance, the web logging service 226 and the mapping engine 228 may be combined into a single engine that performs the functions of both services/engines. Although not illustrated, the various engines of the requesting computer system and the web server may access and/or utilize a processor and memory, such as the processor 102 and the memory 104 of FIG. 1, as needed to perform their various functions.

As briefly discussed, the web server 220A includes the IPv4 endpoint 222 and the IPv6 endpoint 224. The IPv4 endpoint 222 may be capable of processing requests from a requesting computer system that has been assigned an IPv4 address, while the IPv6 endpoint 224 may be capable of processing requests from a requesting computer system that has been assigned an IPv6 address. Notably, each computer system (e.g., the requesting computer system 210A) that communicates with other computer systems on the Internet is assigned an Internet Protocol (IP) address, which may comprise an IPv4 address or an IPv6 address. IPv4 addresses comprise 32-bit addresses, while IPv6 addresses comprise 128 bits.

While a transition to more usage of IPv6 (and therefore, IPv6 addresses) is currently occurring, IPv4 (and therefore IPv4 addresses) was used essentially exclusively for decades. Such ubiquitous use of IPv4 has allowed entities (e.g., corporations) to build extensive knowledge bases of IPv4 addresses over multiple decades. Such knowledge bases may include location data (e.g., data associated with locations of clients based on IP address), reputation data (e.g., is a particular IP address or range of IP addresses associated with spamming, hacking, and so forth), IP-based protection infrastructure, and so forth associated with particular IP addresses (or particular ranges of IP addresses). Accordingly, while the Internet is slowly migrating to IPv6 infrastructure, IPv6 traffic doesn't benefit from the mature IPv4 knowledge base (e.g., of geographic location identification, IP address reputation, and IP-based protection infrastructure).

Previously, IPv4 addresses and IPv6 addresses have been connected only when each address is associated with the same autonomous system number (ASN), which can be found on Internet Assigned Numbers Authority (IANA). ASN's are allocated to autonomous systems (AS), which are a collection of connected IP routing prefixes under the control of one or more network operators on behalf of a single administrative entity or domain. For instance, internet service providers (ISP's) may be allocated one or more particular ASN's. As such, ASN's may aid in uniquely identifying Internet networks. However, such an approach of connecting IPv4 addresses to IPv6 addresses using ASN's may have numerous issues, including inaccuracy. For instance, ASN's may vary in size, as some are relatively small while others are very large, even spanning countries or continents. Additionally, some organizations own multiple ASNs, which can further complicate both the connecting process and the accuracy of such a process. Instead of using ASN's, the principles discussed herein describe a more accurate approach to gathering and jumpstarting knowledge of IPv6 addresses by mapping IPv4 addresses, about which much knowledge has already been gathered, to IPv6 addresses. Such mappings may then be used to infer knowledge about the IPv6 addresses.

Figure 3:
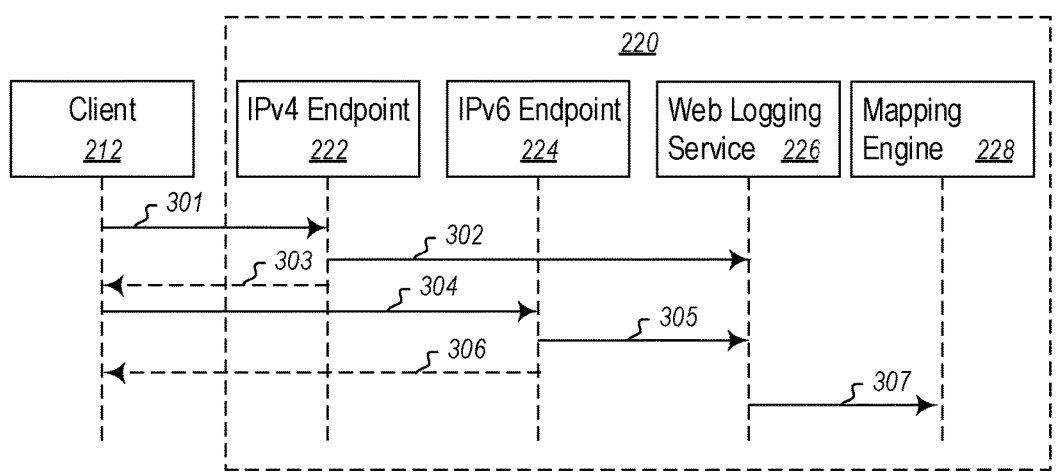
FIG. 3 illustrates a data flowchart for mapping knowledge associated with one or more IP addresses of a first IP type to one or more IP addresses of a second IP type.

FIG. 3 illustrates a data flowchart 300 for creating a mapping of IPv4 addresses to IPv6 addresses, which includes the components (e.g., the client 212, the IPv4 endpoint 222, and so forth) and corresponding actions performed by the components. As illustrated, the client 212 may generate a request 301 (e.g., an HTTP get request) that is sent to the web server 220, which web server comprises a dual stack web server that can process both IPv4 requests and IPv6 requests. For instance, the client 222 may comprise a web browser that is navigating to www.msn.com in response to receiving instructions to do so at the requesting computer system 210A (e.g., by a user at a user interface of the requesting computer system). In such an example, the web server 220 may comprise a web server associated with www.msn.com. Notably, upon sending the request 301 to the web server, the request may be initially routed to either the IPv4 endpoint 222 or the IPv6 endpoint 224 depending upon the initial IP address being used by the requesting computer system 210 (i.e., the computer system that corresponds to the client 212 making the request 301). If the requesting computer system 210 is utilizing an IPv4 address (i.e., the initial IP address type) when the client 212 is making the request 301, the request will be initially routed to the IPv4 endpoint 222, as illustrated in FIG. 2. Alternatively (while not illustrated in FIG. 3), if the requesting computer system 210 is utilizing an IPv6 address as the initial IP address type when the client 212 is making the request 301, the request will be initially routed to the IPv6 endpoint 224.

Regardless of which endpoint (i.e., the IPv4 endpoint or the IPv6 endpoint) initially receives the request, in response to receiving the request, the endpoint that received the initial request may generate a unique ID associated with the request. For instance, the initial endpoint may generate a unique session ID that comprises a globally unique identifier (GUID). The initial endpoint may also generate a timestamp associated with the time at which the request was received. The initial endpoint may then send communication 302, which includes the initial IP address of the initial IP address type (i.e., either an IPv4 address or an IPv6 address) associated with the requesting computer system (i.e., the computer system of the client 212), the generated unique ID, and the generated timestamp, to the web logging service 226. The web logging service 226 may then log, or record, the initial IP address of the initial IP address type (whether an IPv4 address or an IPv6 address) of the requesting computer system 210, the generated unique ID, and the timestamp.

The web server 220, and more specifically, the initial endpoint that received the request 301, may then send communication 303, which includes the generated unique ID, to the client 212. Additionally, the communication 303 may instruct the client 212 to use the unique ID to make a request 304 to a second, different endpoint that is of a different IP version type than the endpoint that received the initial request 301. In other words, if the IPv4 endpoint 222 received the initial request 301 from the client 212 (i.e., the requesting computer system associated with the client made the request 301 using an initial IP address comprising an IPv4 address), the request 304 will be made to the IPv6 endpoint 224 using an IPv6 address that was previously assigned to the requesting computer system. On the other hand, if the IPv6 endpoint 224 received the initial request 301 from the client 222 (i.e., the requesting computer system associated with the client made the request 301 using an initial IP address comprising an IPv6 address), the request 304 will be made to the IPv4 endpoint 222 using an IPv4 address that was previously assigned to the requesting computer system. Accordingly, the principles described herein may be particularly practiced with respect to computer systems (e.g., the requesting computer system 210) that have been assigned both an IPv4 address and an IPv6 address.

In particular, the communication 303 may include instructions for the client 212 to make a request for a resource that is located at the second, different endpoint. Accordingly, the request 304 may be a request for a resource that is located at the second, different endpoint using the generated unique ID and an IP address that comprises a different IP version than the initial IP address used in the request 301 (e.g., if the initial request 301 was made to the IPv4 endpoint using an IPv4 address, the request 304 will be made to the IPv6 endpoint using an IPv6 address). In some embodiments, the resource hosted at the second, different endpoint may comprise a relatively small file such as a .gif file, a .txt file, a .jpeg file, a .png file, a .jpg file, a .tiff file, a .bmp file, a .script file, and so forth. In other embodiments, the resource requested in the request 304 may comprise a dummy resource that does not actually exist. Accordingly, the client 212 may then generate the request 304 associated with retrieving a particular resource from the second, different IP endpoint. In an example, such a request (i.e., the request 301) may comprise an asynchronous JavaScript and XML (AJAX) call, an XMLHttpRequest (XHR) request, and so forth.

In response to receiving the request 304, the second, different endpoint may send communication 305, which includes the second IP address (i.e., the IP addressed used to communicate with the second, different IP endpoint) that comprises a different IP version than the initial IP address used in the request 301, to the web logging service 226. The communication 305 may further include the unique ID (i.e., sent by the client 212 to the second, different endpoint as part of request 304) and a timestamp generated by the second, different endpoint upon receiving the request 304. The web logging service 226 may record the second IP address of a different IP version than the first IP address, the unique ID, and the newly generated timestamp.

Additionally, the second, different IP endpoint may then fulfill the request 304 by sending communication 306 to the client 212. For instance, when the resource (e.g., a .gif file) exists at the second, different IP endpoint, the resource will be sent to the client (and essentially ignored by the client 212, as the resource will not be shown in a user interface of the client). On the other hand, when the resource does not exist, the communication 306 may include notice of such (e.g., an HTTP 404 error, which will not be shown to the user). Accordingly, regardless of whether the resource exists, a user experience of an end user of the client 212 will be unaffected, as the communication 306 is received in the background, and the result of the communication 306 may not be shown to the end user of the client 212.

Furthermore, the web logging service 226 may send communication 307, which includes both IP addresses, the unique ID's (which should be the same), and both generated timestamps, to the mapping engine 228. Upon receiving both IP addresses, the unique ID's, and the generated timestamps, the mapping engine may verify that the time stamps are relatively close in time and that the unique ID's are identical. Upon such verification, the mapping engine may then map the initial IP address received of a first version (e.g., an IPv4 address) to the second IP address received of a second version (e.g., an IPv6 address). Notably, such mapping may be performed by the mapping engine 228 may be performed offline, in some embodiments. Accordingly, for each requesting computer system that makes such a request (i.e., request 301) and has been assigned both an IPv4 address and an IPv6 address, the web server 220 may generate two log lines with the same unique session ID, one with an IPv4 address and the other with an IPv6 address. An IPv6 address to IPv4 address mapping may then be performed by matching session ID's and timestamps with relatively short time differences. Such mappings of IPv6 addresses to IPv4 addresses may include location data, reputation data, IP-based infrastructure data, and so forth, that was all originally associated with the IPv4 address(es) to which the IPv6 address(es) is being mapped.

In many cases, a one to one mapping between IPv6 and IPv4 addresses (i.e., one IPv6 address mapped to one IPv4 address) may be possible. For instance, a one-to-one mapping of IPv6/64 addresses (i.e., IPv6 addresses that have 64 of 128 bits that are fixed) to IPv4/32 addresses (i.e., IPv4 addresses that have all 32 bits of the IPv4 address fixed) may be possible due to the fact that the first 64-bit network prefix of such IPv6 addresses may represent the unique public IP address, while the last 64 bits may be used for tracking the interface identifier.

Notably, one-to-many mappings (i.e., one IPv4 address mapped to many IPv6 addresses or one IPv6 address mapped to many IPv4 address) or many-to-many mappings (i.e., many IPv4 addresses mapped to many IPv6 addresses) may also occur depending on dynamic host configuration protocol (DHCP)/stateless autoconfiguration (SLAAC) configurations of a given user internet service provider (ISP). When multiple mappings occur, the mapping engine 228 may rank particular address mappings (i.e., mappings of particular addresses within the multiple mappings) based on a confidence of the mapping engine of the accuracy of a particular mapping. For instance, the mapping engine may rank particular mappings by computing confidence scores that are based on heuristics. Notably, IPv6/128 to IPv4/32 mappings may be used to deduce DHCP subnet levels for different ISP's, which can then be used to approximate an IPv4 address or subnet for an unseen IPv6 address. Additionally, as briefly described, larger IPv6 address ranges (e.g., IPv6/64, IPv6/56, IPv6/48, and so forth) may also be mapped to a single IPv4 address (i.e., IPv4/32) or a range of IPv4 addresses (e.g., IPv4/26, IPv4/24, IPv4/16, and so forth).

Figure 4:
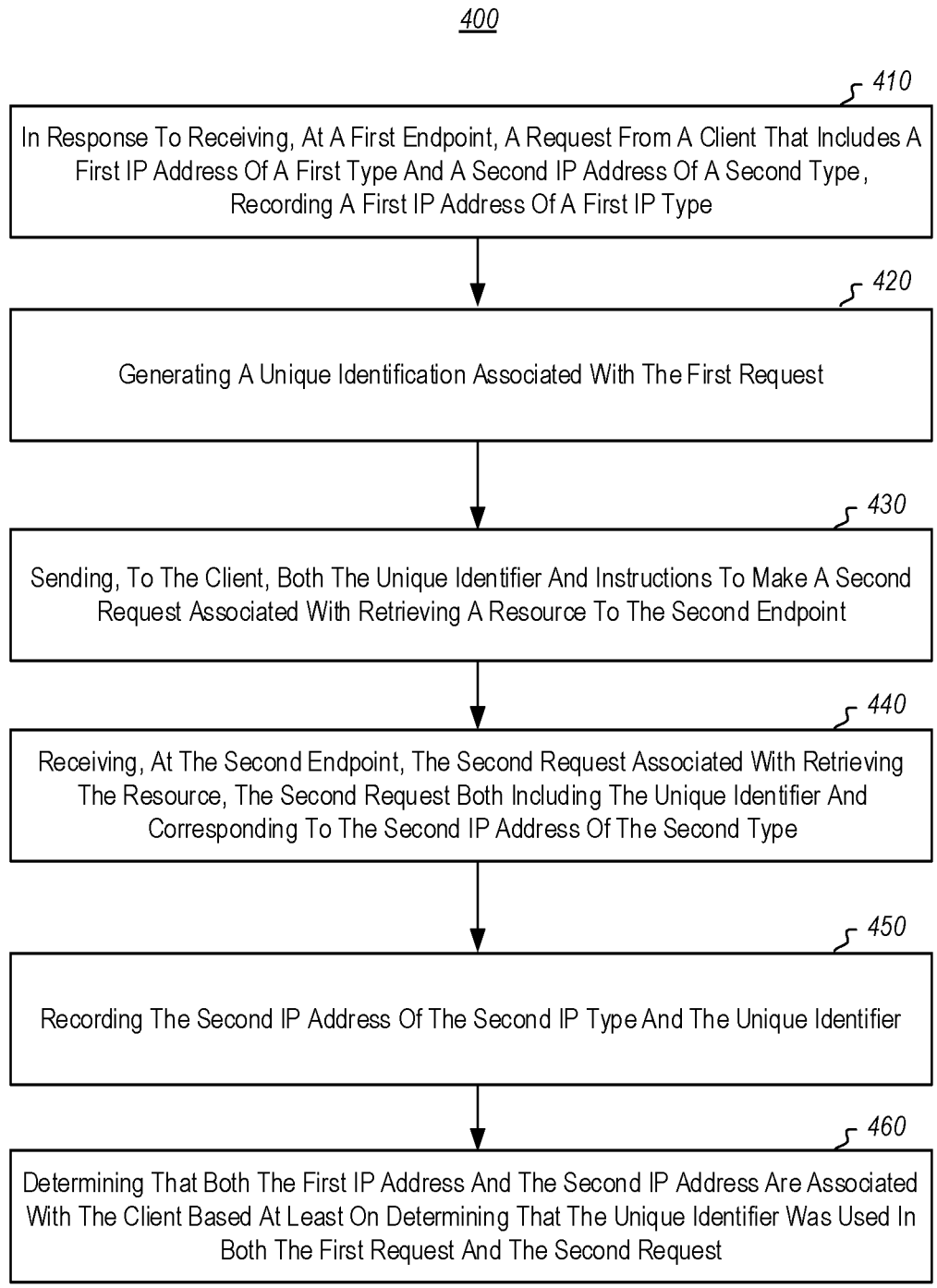
FIG. 4 illustrates a flowchart of a method for mapping knowledge associated with one or more IP addresses of a first IP type to one or more IP addresses of a second IP type.

FIG. 4 illustrates a flowchart of a method 400 for mapping knowledge of one or more IP addresses of a first IP type to one or more IP addresses of a second IP type. The method 400 is described with frequent reference to FIGS. 2 and 3. Notably, the method 400 may particularly be practiced with respect to a dual stack web server comprising at least a first endpoint associated with handling requests of a first internet protocol (IP) type (e.g., IPv4) and a second endpoint associated with handling requests of a second IP type (e.g., IPv6). The method 400 may include, in response to receiving, at the first endpoint, a first request associated with viewing a webpage from a client, performing a number of acts. The client may be associated with at least a first IP address of the first IP type and a second IP address of the second IP type. For instance, the client may comprise a computer system that has been assigned both an IPv4 address and an IPv6 address, and is using a web browser to navigate to the webpage. The webpage may comprise a landing page or other popular webpage. Additionally, the first request may correspond to the first IP address of the first IP type. For instance, the first IP address of the first IP type may comprise an IPv4 address. In such an example, the first endpoint may comprise an IPv4 endpoint.

Accordingly, the method 400 may include, in response to receiving, at a first endpoint, a request from a client that includes a first IP address of a first type and a second IP address of a second type, recording the first IP address of the first IP type (Act 410). For instance, continuing the previous example, the first IP address of the first IP type may comprise an IPv4 address that is sent to, and recorded by, the web logging service. The method 400 may further include generating a unique identification associated with the first request (Act 420). For instance, in response to receiving the first request, the first endpoint may generate a GUID or other unique session identifier associated with the received first request.

The method 400 may further include sending, to the client, both the unique identifier and instructions to make a second request associated with retrieving a resource to the second endpoint (Act 430). In the ongoing example, the unique ID (e.g., a GUID) associated with the first request, as well as instructions to request a resource from the second endpoint, may be sent to the web browser (e.g., client 212) of the requesting computer system 210A. The method 400 may further include, receiving, at the second endpoint, the second request associated with retrieving the resource, the second request both including the unique identifier and corresponding to the second IP address of the second type (Act 440). In the continuing example, the second request may be received at the IPv6 endpoint, and may correspond to a second address that comprises an IPv6 address. The method 400 may further include recording the second IP address of the second IP type and the unique identifier (Act 450). In the continuing example, the IPv6 address and the unique identifier, both associated with the second request, may be sent to, and recorded by, the web logging service.

The method 400 may further include determining that both the first IP address and the second IP address are associated with the client based at least on determining that the unique identifier was used in both the first request and the second request (Act 460). In the ongoing example, the mapping engine may determine that the same unique identifier was used in both the first request and the second request, and may therefore determine that the IPv4 address of the first request and the IPv6 address of the second request both correspond to the same computer system (e.g., the requesting computer system 210). The method 400 may also include, based on determining that the first IP address and the second IP address are associated with the client, mapping the first IP address to the second IP address. Accordingly, in the ongoing example, the mapping engine may map the IPv4 address of the first request to the IPv6 address of the second request based at least on determining that the same unique identifier was used in both the first request and the second request. Additionally, any knowledge (e.g., location data, reputation data, and so forth) previously gathered regarding either the IPv4 address or the IPv6 address may be mapped to the other address.

In this way, accurate and refreshable mapping from IPv6 addresses to IPv4 addresses (and vice versa) may be performed. In particular, mappings can be proven by user connection, thus ensuring accuracy of any given mapping. Similarly, mappings are updated and refreshed in real-time, compared to delayed or stale mapping data gathered from 3rd party data providers. Furthermore, IPv6/128 to IPv4/32 mappings may be used to deduce DHCP subnet levels for different ISP's, which can then be used to approximate an IPv4 address or subnet for an unseen IPv6 address. Notably, one-to-one mappings, one-to-many mappings, and many-to-may mappings are also possible. For instance, larger IPv6 address ranges (e.g., IPv6/64, IPv6/56, IPv6/48, and so forth) may also be mapped to a single IPv4 address (i.e., IPv4/32) or a range of IPv4 addresses (e.g., IPv4/26, IPv4/24, IPv4/16, and so forth) Notably, such mappings may be gathered in an efficient manner, and performed offline.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
 one or more processor(s);
 a first endpoint associated with handling requests of a first internet protocol (IP) type;
 a second endpoint associated with handling requests of a second IP type; and
 one or more computer-readable storage media having stored thereon computer-executable instructions that are executable by the one or more processor(s) to cause the computer system to jumpstart a build of a new knowledge base for a second IP address of the second IP type by mapping a previously built knowledge base associated with a first IP address of the first IP type to the second IP address and to use said mapped previously built knowledge base to infer new knowledge about the second IP address by causing the computer system to perform at least the following:

receive, at the first endpoint, a first request from a client that is associated with at least the first IP address and the second IP address, the first request corresponding to the first IP address;

record the first IP address;

generate a unique identification associated with the first request;

send, to the client, both the unique identifier and instructions to make a second request associated with retrieving a resource from the second endpoint;

receive, at the second endpoint, the second request associated with retrieving the resource, the second request including the unique identifier and corresponding to the second IP address;

record the second IP address and the unique identifier;

determine that both the first IP address and the second IP address are associated with the client based at least on determining that the unique identifier was associated with both the first request and the second request; and based on determining that the first IP address and the second IP address are associated with the client, map the first IP address to the second IP address, wherein mapping the first IP address to the second IP address includes mapping the previously built knowledge base associated with the first IP address to the second IP address to jumpstart the build of the second IP address's new knowledge base, which is then usable to enable an inference to be made about a possible reputation of the second IP address.

2. The computer system of claim 1, wherein a first time stamp is generated when the first request is received and a second time stamp is generated when the second request is received.

3. The computer system of claim 2, wherein determining that both the first IP address and the second IP address are associated with the client is also based on determining that the first time stamp and the second time stamp are closely related in time.

4. The computer system of claim 1, wherein the first IP address comprises an IPv4 address type and the second IP address comprises an IPv6 address type.

5. The computer system of claim 1, wherein the previously built knowledge base associated with first IP address comprises at least one of location data, reputation data, or IP-based infrastructure data.

6. The computer system of claim 1, wherein the resource comprises at least one of a .gif file, a .jpeg file, and a .png file.

7. The computer system of claim 1, wherein the resource comprises an identification of a dummy file that does not actually exist.

8. The computer system of claim 1, wherein the first request is associated with viewing a webpage.

9. A method, implemented at a computer system that includes one or more processors and a dual stack web server that comprises at least a first endpoint associated with handling requests of a first internet protocol (IP) type and a second endpoint associated with handling requests of a second IP type, for jumpstarting a build of a new knowledge base for a second IP address of the second IP type by mapping a previously built knowledge base associated with a first IP address of the first IP type to the second IP address and for using said mapped previously built knowledge base to infer new knowledge about the second IP address, said method comprising:

receiving, at the first endpoint, a first request associated with viewing a webpage from a client that is associated with at least the first IP address and the second IP address, the first request corresponding to the first IP address;

recording the first IP address;

generating a unique identification associated with the first request;

sending, to the client, both the unique identifier and instructions to make a second request associated with retrieving a resource from the second endpoint;

receiving, at the second endpoint, the second request associated with retrieving the resource, the second request including the unique identifier and corresponding to the second IP address;

recording the second IP address and the unique identifier;

determining that both the first IP address and the second IP address are associated with the client based at least on determining that the unique identifier was associated with both the first request and the second request; and based on determining that the first IP address and the second IP address are associated with the client, mapping the first IP address to the second IP address, wherein mapping the first IP address to the second IP address includes mapping the previously built knowledge base associated with the first IP address to the second IP address to jumpstart the build of the second IP address's new knowledge base, which is then usable to enable an inference to be made about a possible reputation of the second IP address.

10. The method of claim 9, wherein a first time stamp is generated when the first request is received and a second time stamp is generated when the second request is received.

11. The method of claim 10, wherein determining that both the first IP address and the second IP address are associated with the client is also based on determining that the first time stamp and the second time stamp are closely related in time.

12. The method of claim 9, wherein the first IP address comprises an IPv4 address type and the second IP address comprises an IPv6 address type.

13. The method of claim 9, wherein the previously built knowledge base associated with first IP address comprises at least one of location data, reputation data, or IP-based infrastructure data.

14. The method of claim 9, wherein the resource comprises an identification of a dummy file that does not actually exist.

15. A computer system configured to leverage a previously built mature knowledge base of an internet protocol (IP) IPv4 address in order to jumpstart a build of a new knowledge base for an IPv6 address, said computer system comprising:

one or more processor(s); and one or more computer-readable hardware storage device(s) having stored thereon computer-executable instructions that are executable by the one or more processor(s) to cause the computer system to:

receive a request from a client computer system to access a computing resource, wherein the request is transmitted using an IPv4 address;

determine that the IPv4 address is associated with a previously built knowledge base describing an identified use associated with said IPv4 address, the previously built knowledge base including one or more of: location data associated with a location where the IPv4 has been used, reputation data associated with how the IPv4 address has been used, or information describing an IP-based protection infrastructure associated with the IPv4 address;

in response to determining that the IPv4 address is to be associated with an IPv6 address, map the IPv4 address to the IPv6 address; and in addition to mapping the IPv4 address to the IPv6 address, map the previously built knowledge base of the IPv4 address to the IPv6 address in order to jumpstart building a new knowledge base for the IPv6 address, which new knowledge base is then usable to enable an inference to be made about how the IPv6 address is to be used.

16. The computer system of claim 15, wherein the reputation data associated with how the IPv4 address has been used includes details regarding whether the IPv4 address is associated with spamming or hacking.

17. The computer system of claim 15, wherein execution of the computer-executable instructions further causes the computer system to:

generate two separate log lines that both share a same unique identification, wherein a first one of the two separate log lines is associated with the IPv4 address and a second one of the two separate log lines is associated with the IPv6 address.

18. The computer system of claim 15, wherein the IPv4 address is mapped to the IPv6 address as well as to a second IPv6 address such that a one-to-many mapping is performed.

19. The computer system of claim 18, wherein each IP address that is included in the one-to-many mapping is ranked such that the IPv4 address, the IPv6 address, and the second IPv6 address are all ranked.

20. The computer system of claim 19, wherein ranking each IP address is based on a confidence regarding an accuracy of said each IP address's corresponding mapping that is performed in the one-to-many mapping.

* * * * *